Sept. 2, 1941.  H. A. ARNOLD  2,254,672
WINDROWER
Filed Oct. 31, 1940   2 Sheets-Sheet 2
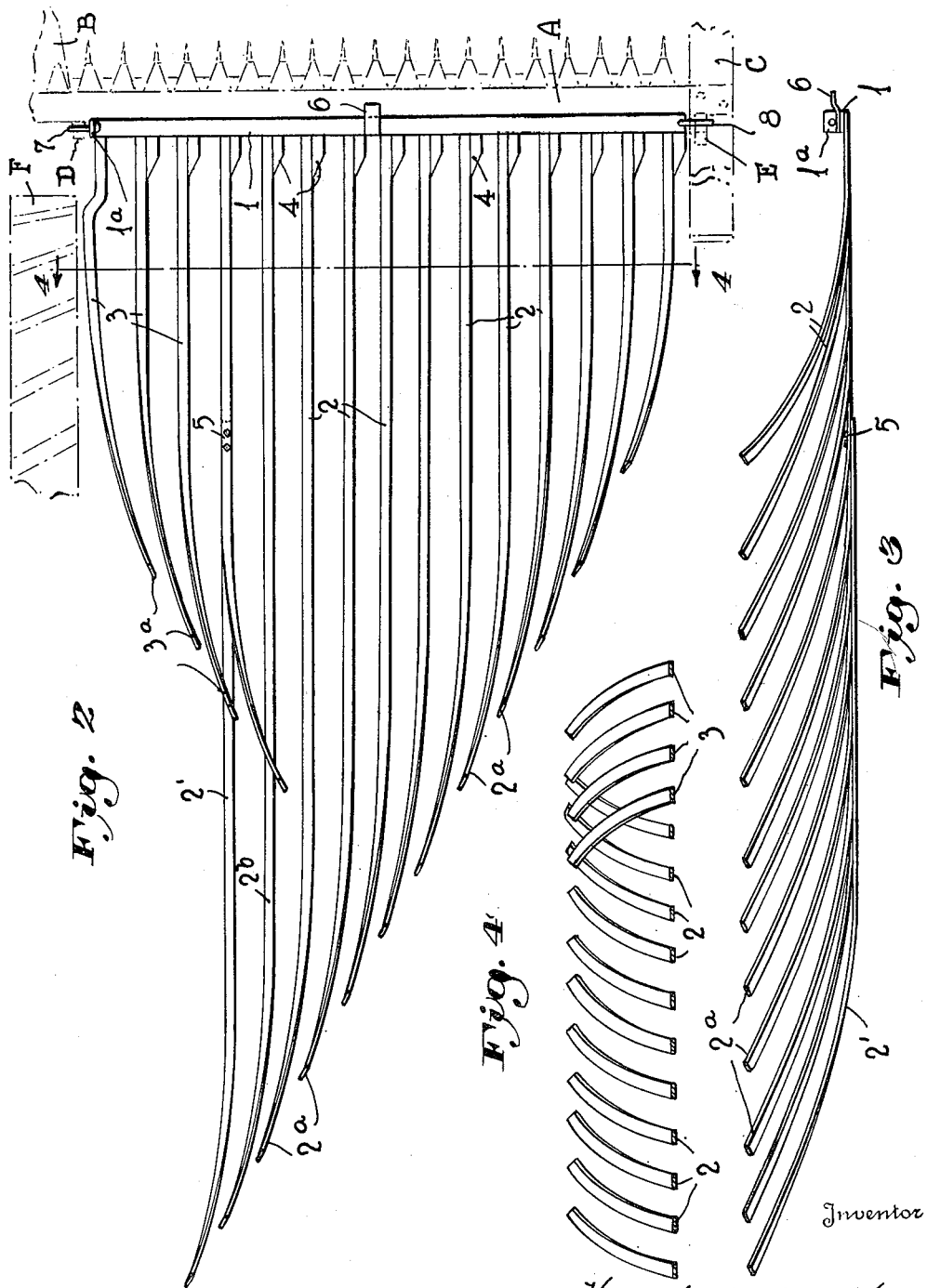
Inventor
Harold A. Arnold,
By Stone, Boyden & Mack,
Attorneys Patented Sept. 2, 1941

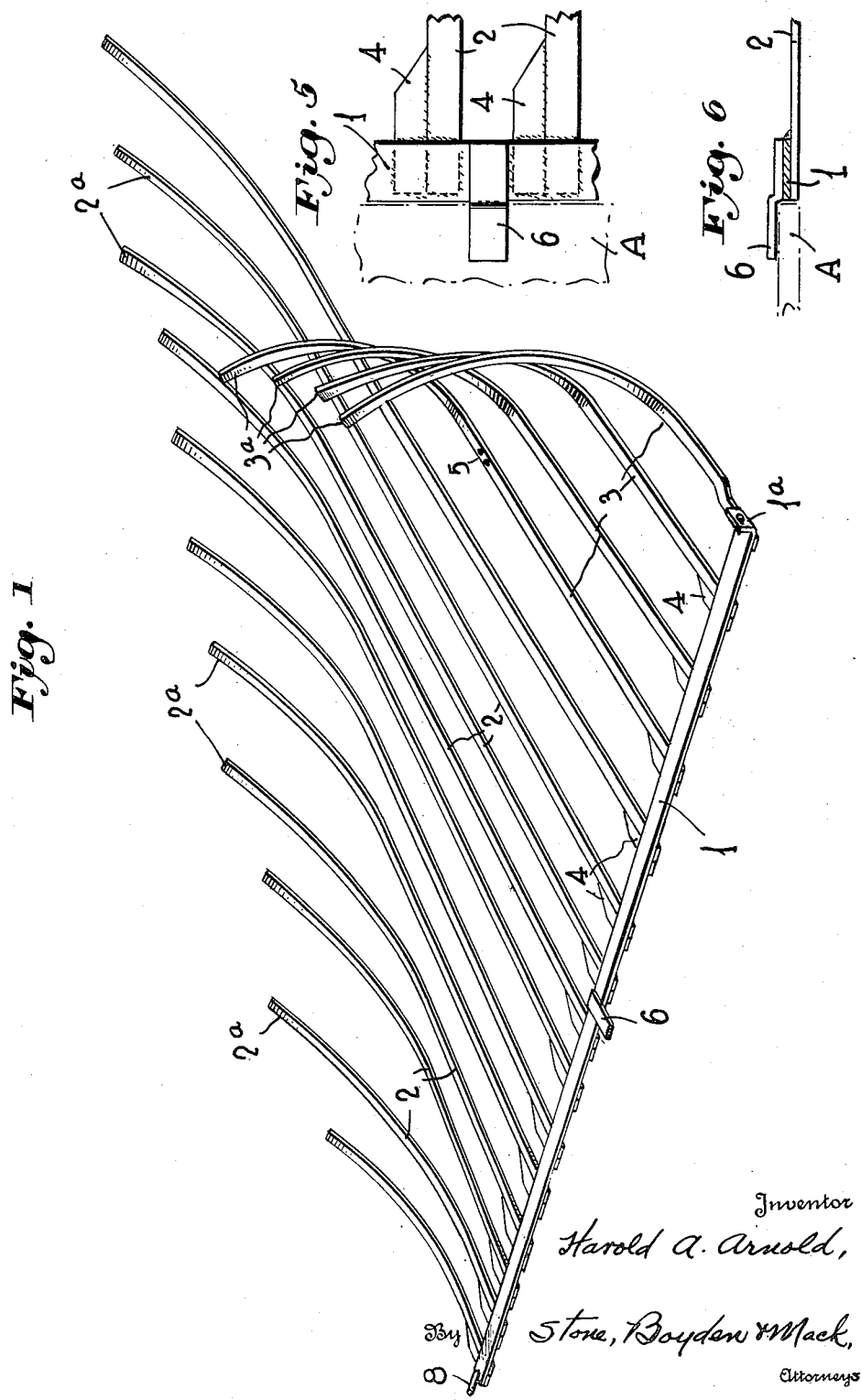

2,254,672

UNITED STATES PATENT OFFICE 2,254,672

WINDROWER

Harold A. Arnold, Knoxville, Tenn., assignor to The University of Tennessee Research Corporation, Knoxville, Tenn., a corporation of Tennessee Application October 31, 1940, Serial No. 363,755

6 Claims. (Cl. 56—192)

This invention relates to windrowers, and more particularly to windrower attachments for tractor mowers.

While capable of other uses, the invention is especially applicable to power driven mowers which cut a relatively wide swath.

My improved windrower comprises two groups of fingers or slats reversely disposed, the slats of one group extending longitudinally beyond those of the other group, and so shaped that the material is discharged laterally therefrom.

An object of the invention is to provide a windrower of this type which will gather up and windrow all of the material throughout the entire width of the swath, without permitting any of it to remain on the ground in the position in which it falls. To this end, the space between the two groups of slats or fingers is substantially no greater than that between the fingers of each group, that is to say, the spacing of the fingers is substantially uniform throughout the full width of the device. Furthermore, one or more of the fingers of the shorter group overlap the adjacent fingers of the other group, as viewed in plan, so that the material in part of the swath is thrown by the group of shorter fingers onto the other group, and is there combined and rolled up with the material in the rest of the swath, falling on the latter, and the roll is then delivered laterally, in a single continuous windrow, from the group of longer fingers at a point rearwardly beyond the ends of the first group.

Another object is to provide a windrower of this character which will deliver the cut material at a point to one side of the center of the cutter bar in such position as to clear the wheels of a "tricycle" type tractor. To this end I preferably make the two groups of fingers of unequal width, the fingers of the narrower group being the shorter, and serving to throw the material onto the longer fingers of the wider group, from which it is delivered laterally in an off-center position.

With the above and other objects in view, and to improve generally upon the details of such devices, the invention consists in the construction, arrangement and combination of parts hereinafter described and claimed, and illustrated in the accompanying drawings forming part of this specification, and in which:

Fig. 1 is a perspective view of my improved windrower;

Fig. 2 is a plan view thereof illustrating the method of attachment to the cutter bar of a mower;

Fig. 3 is a side elevation of the windrower itself;

Fig. 4 is a transverse section substantially on the line 4—4 of Fig. 2, looking in the direction of the arrows; and Figs. 5 and 6 are fragmentary plan and sectional views on an enlarged scale, showing certain details of construction.

Referring to the drawings in detail, my improved windrower comprises a bar 1 to which are rigidly secured groups of slats or fingers 2 and 3 disposed in side by side relation at substantial right angles to the bar.

While the slats or fingers may be secured to the bar in any suitable or desired manner, I have shown them as welded to the under side of the bar and as reinforced by means of gusset plates 4 also welded to the bar and to the fingers.

As will be noted from an inspection of Figs. 1 and 2, the distance between the groups of fingers 2 and 3 is substantially no greater than that between the individual fingers of each group, or, in other words, all of the fingers are substantially uniformly spaced throughout the length of the bar 1.

In the construction of windrowers of this general type as heretofore proposed, it has been the practice to provide between the two groups of fingers a relatively wide delivery space, with the result that the material falling in this space remains lying flat upon the ground and is unwindrowed. This is objectionable because it makes the material more difficult to pick up with a loading machine or the like, especially on rocky ground. In my improved windrower, on the other hand, there is no space or gap between the two groups of fingers, with the result that all of the material throughout the entire width of the swath is windrowed.

Referring again to Figs. 1 and 2, it will be noted that, when the windrower is to be used with tractors of the "tricycle" type, the groups of fingers 2 and 3 are of unequal width, and that the fingers of the wider group 2, at the side adjacent the narrower group, are considerably longer than the fingers 3 of the narrower group and extend a substantial distance rearwardly of the same, as indicated at 2ᵇ in Fig. 2.

It will further be noted that the end portions 2ᵃ and 3ᵃ of the respective groups of fingers are reversely curved, that is to say, as viewed in Figs. 1 and 2, the fingers 2 of the wider group have their ends curved toward the right and toward the narrower group, while the fingers 3 of the narrower group have their ends curved toward the left and toward the wider group.

It will be still further noted by reference to Fig. 2 that the end portions of the shorter fingers 3 of the narrower group overlap the adjacent fingers 2 of the wider group.

In Fig. 2 I have shown an extension 2' secured to the left hand finger 3, as shown at 5, and constituting part of the group of fingers 2. This extension or extra finger 2' is desirable in handling certain types of material but is, as will be noted, omitted from Fig. 1. It may or may not be used as desired.

My improved windrower is especially advantageous when used in connection with tractor operated mowers cutting a relatively wide swath, such as six or seven feet.

In Fig. 2, I have illustrated in broken lines the cutter bar A of such a mower, this cutter bar being usually provided with an inner shoe B and an outer shoe C, of suitable construction. The cutter bars of many commercial mowers are provided, adjacent the shoe B, with a perforated lug D, and this provides a convenient means by which my improved windrower may be attached to the cutter bar. For this purpose, the inner end of the bar 1 is preferably turned up as indicated at 1ª and a bolt 7 is slipped through an opening in this turned up end and through the lug D and secured in position as by means of a cotter pin. At the other or outer end, I may conveniently provide a pin 8 welded to the bar 1 and adapted to be inserted in a lug or socket E carried by the shoe C. In order to steady and support the bar 1 at its middle, I preferably weld thereto a clip or bracket 6, which is adapted to bear against the upper surface of the cutter bar A, as shown more in detail in Figs. 5 and 6. Other methods of attaching and supporting the windrower may, of course, be employed without departing from the spirit of the invention.

One of the drive wheels of the tractor is conventionally indicated at F.

In operation, it will be apparent that the material falling upon the narrower group of relatively short fingers 3 is thrown or delivered by them onto the material falling on the wider group of fingers 2, and that the two portions of the cut material are then combined and rolled up by the end portions of the fingers 2 and delivered laterally from these end portions in the form of a single continuous windrow at a point behind or rearwardly beyond the ends of the fingers 3. It will further be noted that, owing to the unequal width of the two groups of fingers, this windrow is deposited at a point to one side of the center of the swath so that the wheels of a "tricycle" type tractor straddle it when making the next round.

The invention is particularly valuable for windrowing green legume crops for ensiling, since the fact that the entire swath is rolled up and windrowed as above described serves to eliminate rocks and facilitates mechanical loading. The device is also well adapted for handling clover which is being cut for seed, since, due to the fact that the wheels of the tractor clear the windrow, all danger of shattering and loss of seed is avoided.

What I claim is:

1. A windrower comprising a bar, two groups of fingers rigidly secured to said bar in side-by-side relation, and the fingers of each group having their ends curved toward the other group, the distance between the adjacent groups being substantially no greater than that between the individual fingers of each group, so that all of the fingers are substantially equally spaced throughout the entire width of the device.

2. A windrower comprising a bar, two groups of fingers rigidly secured to said bar in side-by-side relation, said groups being of unequal width, and the fingers of each group having their ends curved toward the other group, the distance between the adjacent groups being substantially no greater than that between the individual fingers of each group, and the fingers of the wider group, on the side adjacent the narrower group, being longer than those of said narrower group, so that they discharge the material laterally at a point rearwardly beyond the ends of the fingers of the narrower group.

3. A windrower comprising a bar, two groups of fingers rigidly secured to said bar in side-by-side relation, said groups being of unequal width, and the fingers of each group having their ends extending toward the other group, the distance between the adjacent groups being substantially no greater than that between the individual fingers of each group, and the fingers of the narrower group being shorter than and some of them overlapping the adjacent fingers of the wider group, so as to deliver material onto said wider group.

4. A windrower comprising a bar, two groups of fingers rigidly secured to said bar in closely adjacent side-by-side relation, said groups being of unequal width, and the fingers of the narrower group being arranged in such manner that some of them overlap the adjacent fingers of the wider group and so constructed as to deliver material onto the fingers of the wider group.

5. A windrower comprising a bar, two groups of fingers rigidly secured to said bar in closely adjacent side-by-side relation with no delivery space between them, the fingers of one group having their ends extending toward and arranged to deliver material on to the fingers of the other group.

6. A windrower comprising a bar, and two groups of fingers rigidly secured to said bar in side-by-side relation, the distance between the adjacent groups being substantially no greater than that between the individual fingers of each group, and the fingers of one group, on the side adjacent the other group, being longer than those of said second group and having ends curved toward the same, so that they discharge the material laterally at a point rearwardly beyond the ends of the fingers of said second group.

HAROLD A. ARNOLD.